(12) United States Patent
Kraft

(10) Patent No.: US 6,424,829 B1
(45) Date of Patent: Jul. 23, 2002

(54) WIRELESS COMMUNICATION TERMINAL HAVING SORTING MEANS FOR SORTING SHORT MESSAGES INTO AN APPROPRIATE FOLDER FOR STORAGE

(75) Inventor: Christian Kraft, Copenhagen (DK)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/382,667

(22) Filed: Aug. 25, 1999

(30) Foreign Application Priority Data

Aug. 26, 1998 (GB) ............................................. 9818614

(51) Int. Cl.[7] .......................... H04M 11/10; H04Q 7/20
(52) U.S. Cl. ...................... 455/412; 455/466; 455/566; 455/415; 340/7.52
(58) Field of Search ................. 455/466, 566, 455/412, 414, 415, 458, 517, 461, 556; 340/7.51, 7.52, 7.55

(56) References Cited

U.S. PATENT DOCUMENTS

| | | | |
|---|---|---|---|
| 5,377,354 A | * 12/1994 | Scannell et al. | 709/103 |
| 5,594,658 A | 1/1997 | Lemaire et al. | 709/245 |
| 5,604,788 A | 2/1997 | Tett | 455/412 |
| 5,604,921 A | * 2/1997 | Alanara | 455/45 |
| 5,705,995 A | * 1/1998 | Laflin et al. | 340/7.58 |
| 5,796,394 A | * 8/1998 | Wicks et al. | 345/751 |
| 5,920,826 A | * 7/1999 | Metso et al. | 455/466 |
| 5,973,612 A | * 10/1999 | Deo et al. | 340/7.58 |
| 6,021,321 A | * 2/2000 | Kawashima | 340/7.55 |
| 6,049,713 A | * 4/2000 | Tran et al. | 455/415 |
| 6,119,014 A | * 9/2000 | Alperovich et al. | 455/466 |
| 6,249,668 B1 | * 6/2001 | Abe et al. | 340/7.2 |

FOREIGN PATENT DOCUMENTS

| | | | |
|---|---|---|---|
| DE | 19618218 | 6/1997 | H04Q/7/32 |
| EP | 0413537 | 2/1991 | H04L/12/54 |
| EP | 0748135 | 12/1996 | H04Q/7/22 |
| EP | 0 752 793 | 1/1997 | H04Q/7/32 |
| EP | 0 777 394 | 6/1997 | H04Q/7/22 |
| GB | 2 316 515 | 2/1998 | G08B/7/06 |
| WO | 94/15431 | 7/1994 | H04M/11/00 |
| WO | 97/08906 | 3/1997 | H04Q/7/22 |

OTHER PUBLICATIONS

*GSM Technical Specifications* 03.40 [12], "Technical realization of the Short Message Service (SMS); Point–to–Point (PP)", GSM 03.40 version7.1.0 by the European Telecommunications Standards Institute (ETSI) (1998–11).
*GSM* 04.11 version 6.0.1 by European Telecommunications Standards Institute (ETSI) (1998–08).
*GSM* 4.12 version 5.0.2 by European Telecommunications Standards Institute (ETSI) (Apr. 1997).

* cited by examiner

Primary Examiner—William Trost
Assistant Examiner—Rafael Perez-Gutierrez
(74) Attorney, Agent, or Firm—Antonelli, Terry, Stout & Kraus, LLP

(57) ABSTRACT

The invention relates to a method and a wireless communication terminal (100) for handling location independent short messages. The terminal (100) comprises control means for handling receiving and/or transmitting a location independent short message over a cellular communication network (120). The short message comprises identification means. Also, the terminal (100) comprises display means (150) for presenting short messages to a user of the terminal (100), and one message folder (220) to place and/or store location independent short messages in. The folder (220) is provided on the display means (150), and having sorting means to select location independent short messages upon receiving/sending a location independent short message. The sorting means sorts a message automatically into the folder (220), when the identification means in the location independent short message is recognized by the sorting means.

25 Claims, 3 Drawing Sheets

WIRELESS COMMUNICATION TERMINAL HAVING SORTING MEANS FOR SORTING SHORT MESSAGES INTO AN APPROPRIATE FOLDER FOR STORAGE

BACKGROUND OF THE INVENTION

The present invention relates to a wireless communication terminal, for handling location independent short messages, and a method for handling location independent short messages in a wireless communication terminal.

The use of wireless communication terminals, e.g., cellular phones, is increasing enormously today. The need for using more sophisticated functions, on these kinds of terminals, is also increasing. One of these functions may be sending and/or receiving short messages by using Short Message Services (SMS). Other functions may be receiving/sending data calls.

When receiving/sending several SMS messages it might cause some problems to handle these messages. For example, a user may receive a lot of SMS messages which are not very important to the user, and perhaps only one SMS message which is very important for the user. Thus, it might be difficult to sort out all the less important messages first before finding the most important messages. Also, if the user has sent a lot of messages to different receivers, and the user needs to see if he has sent a message to a particular receiver or not, it will be difficult to find this message if there are several sent messages stored/placed after each other. Therefore, there is a need to handle SMS messages in a more efficient way, in order to find short messages more easily.

The NOKIA 9000 Communicator is provided with a special SMS directory, which makes it possible for the user to create own directories, A directory is a folder which the user may store/place, and organize the messages in. Thus, the folders will facilitate the handling of SMS messages. Also, upon receiving an SMS message the message will automatically go in to one message folder for received messages.

Another way of handling messages. by using group folders, is software programs for electronic mails, so called e-mails. Programs which can handle this kind of messages are e.g. Netscape Mail, provided in Netscape Navigator™ Version 3.01, and Internet mail, provided in Microsoft Internet Explorer Version 3.02. Further, in Internet Mail it is possible to define the user settings in a way so that an electronic mail is automatically sorted into a folder, upon receiving the electronic mail. This may be done by defining one or more parameters in the program, which shall be fulfilled when sorting the received electronic mail into a specified folder. One parameter may for example be the sender's address of the received mail. Another parameter can be messages comprising a particular subject.

What have been discussed above is only relating to location independent SMS, like Point-to-Point (PP) Short Message Service (SMS) messages. which is defined in GSM 04.11 version 6.0.1 by the European Telecommunications Standards Institute (ETSI). The present invention also relates PP SMS, not only for Global System for Mobile communications (GSM) but also for other types of cellular systems using PP SMS, like Digital-American Mobile Phone Service (D-AMPS), Digital Enhanced Cordless Telecommunications (DECT), etc.

EP-A2-0,752,793 discloses a way to handle broadcast messages, which gives a user who has the possibility to receive an SMS broadcast message, an ability to specify what type of SMS broadcast message he/she is interested in receiving. Also, the user can selectively enable and disable the reception of these broadcast messages, and has an ability to control the storage and display of broadcast messages. The handling of the display of broadcast messages, is done by enabling the user to select a category and display a list of the broadcast:messages in a selected category. This is a very nice feature, which is regarding so called SMS broadcast messages. EP-A2-0,752,793 gives examples of how this invention can be used in particular for TDMA (time division multiple access). In GSM, which is also based on TDMA, the SMS cell broadcast is defined in GSM 4.12 version 5.0.2 by the European Telecommunications Standards Institute (ETSI).

However, even if the SMS broadcast feature in EP-A2-0,752,793 is very useful, it does not support the use of PP SMS. Also, the user has very limited ways of control SMS broadcast messages, since this is usually defined by the operator of the cellular network. Upon, reception of an SMS broadcast message, the user normally gets a separate indication saying that this is an SMS broadcast message. To read the SMS broadcast message, the user can enter a special menu for reading the message. The SMS broadcast messages are dependant on the location of the receiver (user), i.e., the user can only receive SMS broadcast messages when he is connected to a cell which is dedicated to send out this type of messages. Thus, there is a great difference between PP SMS and SMS broadcast, since PP SMS is not dependant on the geographical location of the user. Also, the sender of a PP SMS message has to specify an address to the receiver. This is not necessary for broadcast messages, since the sender sends the broadcast message to all receivers in a particular geographical area, i.e., the receiver is not specified beforehand. For example, the user today can only receive his PP SMS messages into one single folder, on his/her wireless communication terminal. This means that it can be very difficult to monitor the different types of PP SMS messages, e.g., if you receive some private messages at work and vice versa. Hence, there is a need for handling PP SMS messages more efficiently.

It is therefore an object of the present invention to facilitate and improve the handling of location independent short messages, like Point-to-Point SMS messages, in a wireless communication terminal, upon receiving/sending messages.

SUMMARY OF THE INVENTION

This object is achieved in accordance with the present invention by a wireless communication terminal for handling location independent short messages, preferably Point-to-Point short messages, said terminal comprising control means for handling receiving and/or transmitting a location independent short message over a cellular communication network, said short message comprising identification means, display means for presenting location independent short messages to a user of the terminal, and a message folder to place and/or store location independent short messages in, said folder being provided on said display means, wherein said message folder is provided with sorting means to select location independent short messages upon receiving or sending a location independent short message, said sorting means comprising at least one parameter defining a category of location independent short messages, and will automatically sort a message into said folder when the identification means in the location independent short message corresponds to said parameter, and wherein the terminal is provided with a Calling Line Identification (CLI), identifying a transmitter of a location independent short message.

One particular advantage, provided by the present invention, is that it will be possible to sort received/sent location independent short messages automatically in a message folder, when the folder recognizes, e.g., the number of the receiver/sender. This means that the user of a location independent short messages in a wireless communication terminal can specify messages to be sorted in a personalized way.

Further advantages of the method and the wireless communication terminal according to the present invention will be apparent from the dependent claims.

Even if the NOKIA 9000 Communicator provides a very good solution to handle point-to-point SMS messages, there are some improvements which are desirable. For example, if you receive a lot of messages, and place/store them in the message folder, it might still be difficult and cause problems to sort out the most important ones, Also, the user has to organize all the received/sent messages by himself/herself, in order to find a message for later use. Embodiments of the present invention facilitate the handling of location independent short messages, like Point-to-Point SMS messages, in a wireless communication terminal, upon receiving/sending messages.

BRIEF DESCRIPTION OF THE DRAWINGS

The invention will be described in greater detail in the following by way of example only and with reference to the attached drawings, in which FIG. 1 schematically shows a connection between two wireless communication terminals and a server, according to a preferred embodiment according to the present invention.

DETAILED DESCRIPTION OF THE INVENTION

Figure 1:
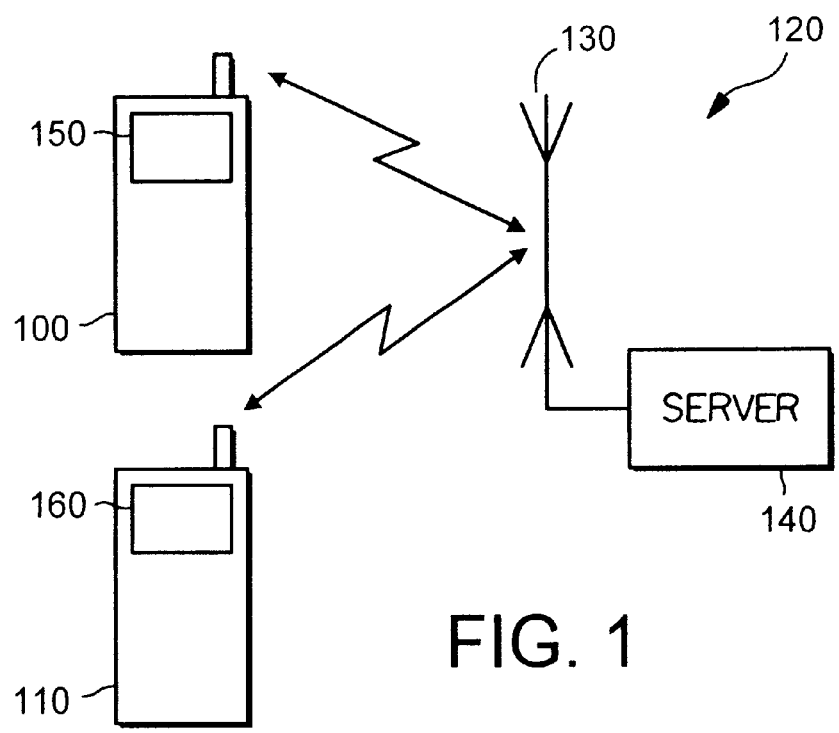

FIG. 1 schematically shows an embodiment of a first 100 and a second 110 wireless communication terminals connected to a cellular communication network 120. The network 120 comprises an antenna 130 for receiving and transmitting calls between terminals, a server 140 which can handle short messages, i.e., SMS messages. The terminals 100,110 in this embodiment symbolizes two cellular phones. Both terminals 100,110 are provided with control means (not shown) for handling receiving and/or transmitting location independent short messages. like Point-to-Point SMS messages, over the network to at least one receiver. How to establish a connection between an SMS server 140 and a terminal 100,110 provided with control means for handling short messages, is commonly known and is disclosed in detail for example in GSM Technical Specifications 03.40 [12], "Technical realization of the Short Message Service (SMS); Point-to-Point (PP)", GSM 03.40 version 7.1.0 by the European Telecommunications Standards Institute (ETSI). Location independent and Point-to-Point SMS messages are hereafter referred to as SMS messages or short messages. Point-to-Point (PP) SMS messages are independent on the location of the receiver (user), i.e., the sender of a PP SMS message has to specify an address to the receiver. Hence, PP SMS is not dependant on the geographical location of the user.

A short message comprises identification means (not shown), e.g., the receivers/senders phone number, name, directory number, etc., i.e., some kind of information which tells who the message is from. To identify the sender/transmitter of a short message (and voice calls as well), the receiver's terminal may be provided with a Calling Line Identification (CLI), which is a commonly used feature in GSM phones today. The CLI allows the terminal to recognize and presents, e.g., the number of a sender/transmitter. Also, if the number of a sender/transmitter is saved under a name in the terminal, it may be possible to present the name of a sender/transmitter.

In order to read the short messages, the terminals 100,110 are provided with display means 150,160 for presenting short messages to the users of the terminals. The display means 150,160 can comprise an integrated display, provided with an interface provided in the terminal. This kind of display 150,160 means is commonly known, and will not be disclosed any further.

Figure 2:
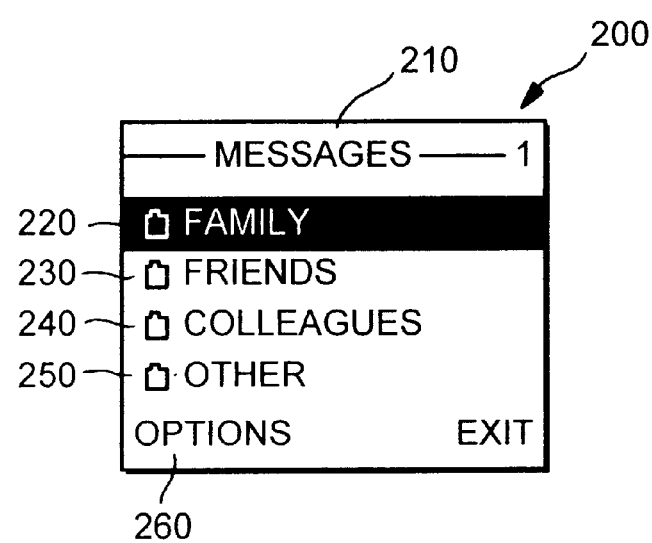
FIG. 2 shows a user interface on a wireless communication terminal, according to a preferred embodiment according to the present invention.

Furthermore, at least one of the terminals 100 is provided with a message folder, e.g., the one shown in FIG. 2, to place and/or store short messages in. This folder is presented on the display means 150. FIG. 2 shows an example on how several message folders can be presented on the display means 150. In accordance with an embodiment of the present invention, the message folder is provided with sorting means (not shown) to select short messages, when receiving or sending a short message. The sorting means can be a software provided in the terminal 100, which makes it possible for a user of the terminal to define certain sorting criteria in the folder. The sorting criteria comprises information about the identification means in received/transmitted messages. When the sorting means recognizes the identification means in a short message, it will automatically sort the message into the folder. If the sorting means does not recognize the identification means, it may be possible to, e.g., delete the message or place/store it in the root of the terminal, i.e., outside the message folder. The user can define the sorting criteria, but it may also be possible for a supplier/operator or others to define the sorting criteria.

FIG. 2 shows an embodiment of a user interface 200 provided on the display means 150, shown in FIG. 1, in accordance with the present invention. The user interface 200 can be provided with several menus, wherein one of the menus 210 is intended especially for location independent short message, like Point-to-Point SMS messages. Location independent and Point-to-Point SMS messages are hereafter referred to as SMS messages or short messages. This menu 210 is indicated by "Messages" in FIG. 2. In the menu, it is possible for a user to define a folder 220–250 in a way so that a message is automatically sorted into the folder 220–250, when the user transmits/receives the message. The folder 220–250 can be defined in a menu, other than the message menu 210, called "Options" 260. In the options menu (not shown) the user defines one or more parameters connected to the folder, i.e., these parameters are the same as the sorting criteria. These parameters shall be fulfilled when the received/transmitted message is going to be sorted into the specified folder 220–260. One parameter may be the receivers/senders phone number, name, etc., i.e., information which identifies the receiver/sender.

Further, it is possible to indicate, in, e.g., the message menu 210, how many messages there are in a folder, and how many messages are unread (not shown).

As being evident from FIG. 2, it is possible to have more than one folder. These folders can be provided by folder creation means, e.g., given in the options menu, which enables the user to create a new folder. The user may define different categories for the folders 220–250, e.g., "Family" 220, "Friends" 230, "Colleagues" 240, "Other" 250, etc. This enables the user to separate private messages and messages related to the users profession. It may also be possible to provide the terminal with predefined message folders, which are editable in order to define a category of receiver(s)/sender(s). These pre-defined folders may be supplied by the terminal manufacturer.

As in the, first case having only one folder, it is possible to automatically sort short messages into the new/pre-defined folder created by the folder creating means or the supplier. Thus, the new/pre-defined folder can be provided with sorting means, which automatically sort a short message into the-new folder corresponding to the identification means in the short message.

Another advantageous embodiment is that the folders may be provided with pre-defined and/or editable information of the identification means in a short message from a sender/receiver. This information can comprise details of the identification means from, e.g., an operator and/or a terminal supplier, which enables the terminal to receive advertisements. It is also possible that the information comprises details from a news supplier or other service company, which enables the terminal to receive messages comprising headlines, weather, traffic, etc. This pre-defined information can also be supplied by the terminal manufacturer.

Figure 3:
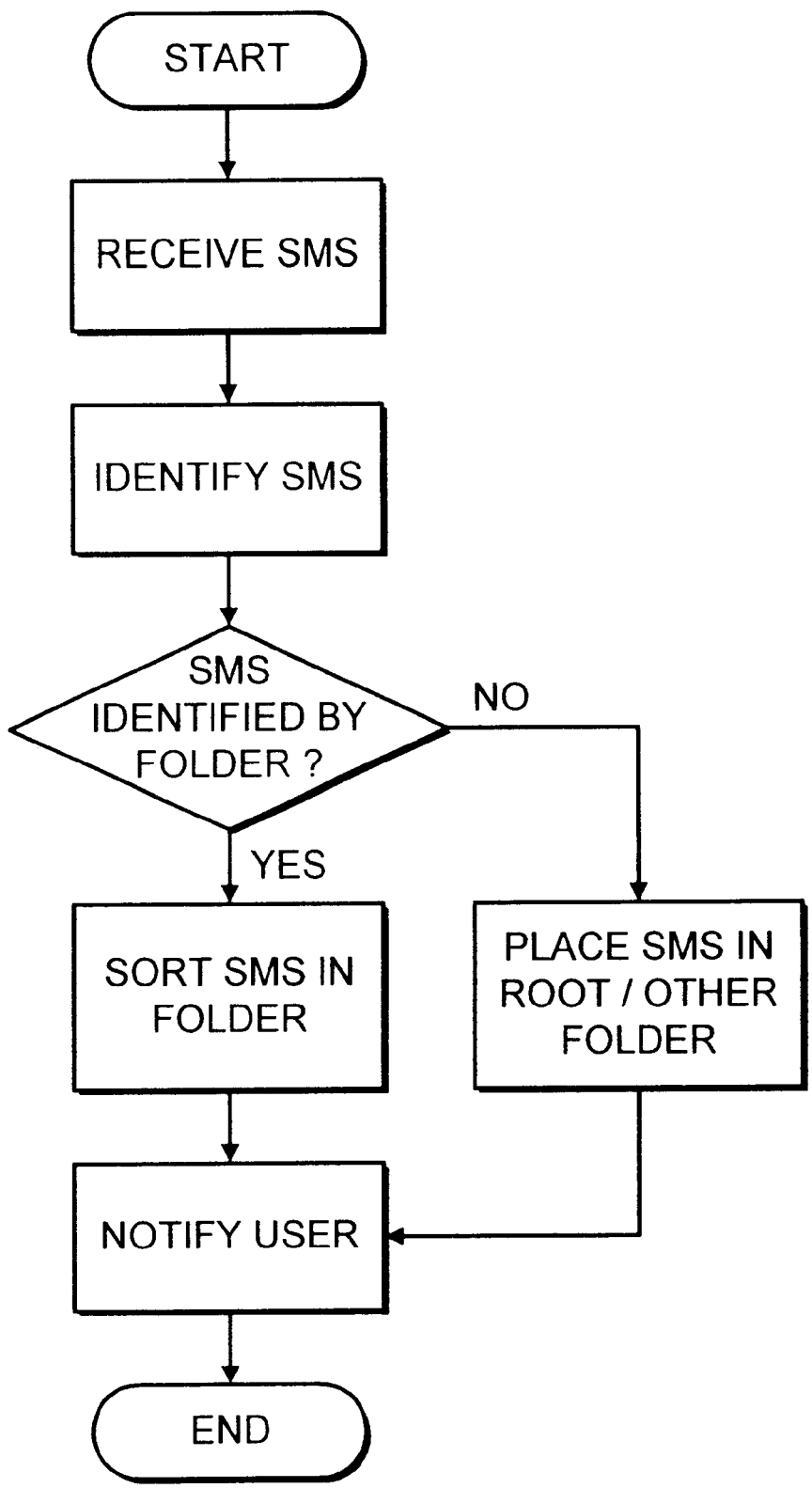
FIG. 3 shows a flowchart over the identification of a location independent short message, according to a preferred embodiment according to the present invention.

FIG. 3 shows a flowchart of the receiving and identification of a location independent short message, like Point-to-Point short message, in a wireless communication terminal, according to a preferred embodiment according to the present invention. Location independent and Point-to-Point SMS messages are hereafter referred to as SMS messages or short messages. First, the terminal receives a short message, "RECEIVE SMS". Then, the terminal identifies the message, "IDENTIFY SMS", by reading the identification means in the message. This identification means may be, e.g., the receivers/senders phone number, name, directory number etc., i.e., some kind of information which tells who the message is from. When the terminal has identified the message, by, e.g., a Calling Line Identification (CLI), a message folder provided in the terminal will compare the identification means with parameters, specified in a folder, "SMS IDENTIFIED BY FOLDER?". These parameters may be information about the identification means. If the folder identifies the identification means in the message, "SORT SMS IN FOLDER", the message will be placed/stored in the folder. If the folder does not recognize the identification means in the message, "PLACE SMS IN ROOT/OTHER FOLDER", the message may be placed/stored, or deleted at another location, This location may be, e.g., in another folder or in the root of the terminal, i.e., outside the message folder. Finally, the user is notified, "NOTIFY USER", by a signal generated in the terminal, e.g., by an audible signal and/or a visual signal, indicating that a new message is received. It is also possible to indicate in which folder, or what kind of placement, the message is to be placed in. This indication can be, e.g., showing a number of received messages in the folder or in the root of the terminal.

If the user sends a message, instead of receiving a message, it will be a corresponding procedure as disclosed in FIG. 3, without the first two steps shown in the flowchart. When the message is sent the user may also be notified by the terminal, indicating that the message has been sent.

Figure 4:
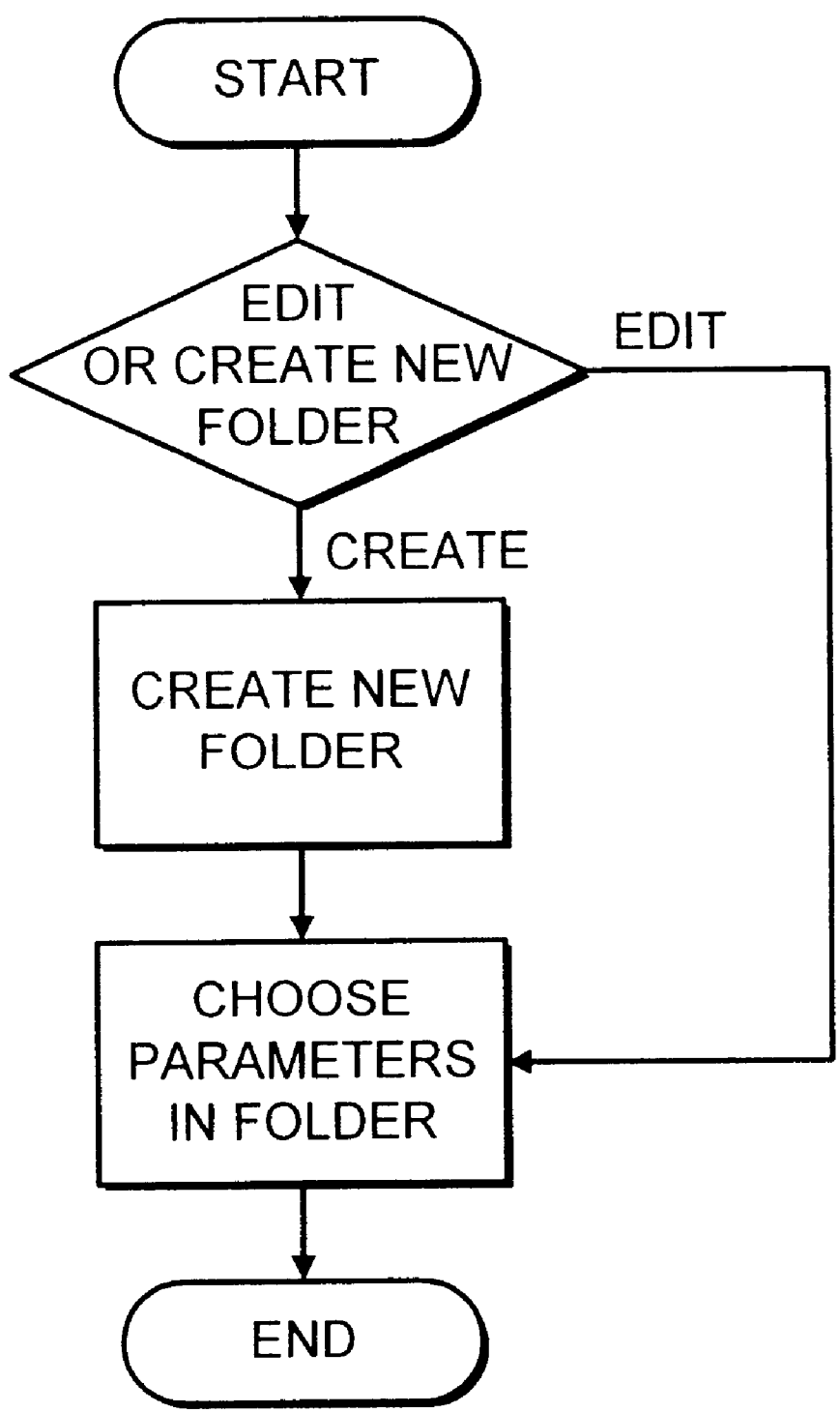
FIG. 4 shows a flowchart over a procedure to create or edit parameters in a message folder, according to a preferred embodiment according to the present invention.

FIG. 4 shows a flowchart for a procedure to create a new message folder or edit parameters in an existing message folder, according to a preferred embodiment according to the present invention. First, the user may choose an option in a menu for messages in the wireless communication apparatus. These options can be to edit an existing message folder, or it can be to create a new message folder, "EDIT OR CREATE NEW FOLDER". If the user would like to create a new folder, "CREATE NEW FOLDER", the user may choose a name and location for the new folder. Thus, it may be possible to create subfolders. Thereafter, the user may choose which parameter(s) to be set in the folder, "CHOOSE PARAMETERS IN FOLDER". A parameter can be information about the identification means in a location independent short message received or transmitted by the terminal. Thus, the user can type, e.g., the name and/or the number of the receiver/transmitter as one parameter, by means of a keyboard provided on the terminal. If the user chooses not to create a new folder, but editing an existing folder instead, the user chooses parameters as described in the "CHOOSE PARAMETERS IN FOLDER" box, The invention is not limited to the above described and in the drawings shown examples of an embodiment but can be varied. For example, even if the embodiment is referring to GSM networks, it is possible to use other types of cellular systems using Point-to-Point SMS, like Digital-American Mobile Phone Service (D-AMPS), Digital Enhanced Cordless Telecommunications (DECT), etc., which all are based on TDMA (time division multiple access). Also, it is not necessary, to use a wireless communication terminal to send/receive a short message. For example, a terminal can be a personal computer connected to a telephone network, and transmit/receive messages via an SMS server.

The present invention includes any novel feature or, combination of features disclosed herein either explicitly or any generalization thereof irrespective of whether or not it relates to the claimed invention or mitigates any or all of the problems addressed.

What is claimed is:

1. Wireless communication terminal for handling location independent short messages, preferably Point-to-Point short messages, said terminal comprising:

control means for handling transmitting of a location independent short message over a cellular communication network, said short message comprising identification means, display means for presenting location independent short messages to a user of the terminal, and a message folder to place and/or store transmitted location independent short messages in, said folder being provided on said display means, wherein said message folder is provided with sorting means to select location independent short messages upon sending a location independent short message, said sorting means comprising at least one parameter defining a category of transmitted location independent short messages, and will automatically sort a message into said folder when the identification means in the transmitted location independent short message corresponds to said parameter.

2. A wireless communication terminal according to claim 1, wherein the display means is provided with folder creation means to create one or more new folders comprising information about a receiver's or a senders identification means in location independent short messages.

3. A wireless communication terminal according to claim 2, wherein the terminal comprises further message folders, which are provided with pre-defined and/or editable information about the identification means from a receiver/sender of location independent short messages.

4. A wireless communication terminal according to claim 2, wherein said new folders comprising sorting means, which automatically sort a location independent short message into the new folder corresponding to the identification means in the location independent short message.

5. A wireless communication terminal according to claims 4, wherein the terminal comprises further message folders, which are provided with pre-defined and/or editable information about the identification means from a receiver/sender of location independent short messages.

6. A wireless communication terminal according to claim 4, wherein the terminal is provided with a Calling Line Identification (CLI), identifying a transmitter of a location independent short message.

7. A wireless communication terminal according to claim 4, wherein the terminal comprises further message folders, which are pre-defined.

8. A wireless communication terminal according to claim 2, wherein the terminal is provided with a Calling Line Identification (CLI), identifying a transmitter of a location independent short message.

9. A wireless communication terminal according to claim 2, wherein the terminal comprises further message folders, which are pre-defined.

10. A wireless communication terminal according to claim 1, wherein the terminal comprises further message folders, which are provided with pre-defined and/or editable information about the identification means from a receiver/sender of location independent short messages.

11. A wireless communication terminal according to claim 10, wherein the terminal is provided with a Calling Line Identification (CLI), identifying a transmitter of a location independent short message.

12. A wireless communication terminal according to claim 10, wherein the terminal comprises further message folders, which are pre-defined.

13. A wireless communication terminal according to claim 1, wherein the terminal is provided with a Calling Line Identification (CLI), identifying a transmitter of a location independent short message.

14. A wireless communication terminal according to claim 1, wherein the terminal comprises further message folders, which are pre-defined.

15. A wireless communication terminal according to claim 14, wherein the terminal is provided with a Calling Line Identification (CLI), identifying a transmitter of a location independent short message.

16. Method for handling location independent short messages, preferably Point-to-Point short messages, in a wireless communication terminal, comprising the following steps:

transmitting a location independent short message over a cellular communication network, said transmitted location independent short message comprising identification means, and presenting the short message on display means provided on the terminal, said display means is provided with a message folder to place and/or store transmitted location independent short messages in, wherein said message folder compares the identification means in the transmitted location independent short message, upon sending the location independent short message, with at least one parameter defined in the message folder and automatically sorts the transmitted location independent short message into the folder when the identification means in the transmitted location independent short message corresponds to the parameter.

17. A method for handling location independent short messages according to claim 16, further comprising defining at least one new message folder, and placing/storing messages in the new folder, said new folder comprising information about a receiver's/sender's identification means in location independent short messages.

18. A method for handling location independent short messages according to claim 17, wherein said new folder automatically sorts a location independent short message into the new message folder corresponding to the identification means in the location independent short message.

19. A method for handling short messages according to claim 18, further comprising the terminal identifying a transmitter of a location independent short message by using a Calling Line Identification (CLI).

20. A method for handling location independent short messages according to claim 17, further comprising the user defining the new message folder or the terminal defining the new message folder automatically.

21. A method for handling location independent short messages according to claim 20, wherein said new folder automatically sorts a location independent short message into the new message folder corresponding to the identification means in the location independent short message.

22. A method for handling short messages according to claim 20, further comprising the terminal identifying a transmitter of a location independent short message by using a Calling Line Identification (CLI).

23. A method for handling short messages according to claim 17, further comprising the terminal identifying a transmitter of a location independent short message by using a Calling Line Identification (CLI).

24. A method for handling short messages according to claim 16, further comprising the terminal identifying a transmitter of a location independent short message by using a Calling Line Identification (CLI).

25. A radio handset for transmitting signals representative of location independent text messages comprising, a memory store arranged for storing transmitted location independent text messages of a predetermined type in a predetermined folder; and a processor for processing signals representative of a transmitted location independent text message, the processor being arranged to recognize signals indicative of a message of the predetermined type and direct the message for storage in the predetermined folder.

* * * * *